(12) United States Patent
Barr

(10) Patent No.: US 6,252,171 B1
(45) Date of Patent: Jun. 26, 2001

(54) LADDER-TYPE CABLE TRAY WITH POWER CHANNEL

(76) Inventor: Charles Barr, 2736 Franklin St., San Francisco, CA (US) 94123

( * ) Notice: Subject to any disclaimer, the term of this patent is extended or adjusted under 35 U.S.C. 154(b) by 0 days.

(21) Appl. No.: 09/295,513

(22) Filed: Apr. 21, 1999

Related U.S. Application Data

(63) Continuation of application No. 09/246,683, filed on Feb. 8, 1999.

(51) Int. Cl.[7] .................................................... H02G 3/04
(52) U.S. Cl. .............................................. 174/95; 248/49
(58) Field of Search ............................ 174/48, 53, 68.3, 174/72 C, 95, 96, 97, 101; 248/49

(56) References Cited

U.S. PATENT DOCUMENTS

| | | | |
|---|---|---|---|
| 3,521,843 | * 7/1970 | Ogle | 248/58 |
| 4,059,328 | * 11/1977 | Rigo | 174/53 |
| 4,146,287 | * 3/1979 | Jonsson | 174/49 |
| 4,232,845 | * 11/1980 | Turner | 248/49 |
| 4,432,519 | * 2/1984 | Wright | 248/49 |
| 4,983,785 | * 1/1991 | Johnston | 174/53 |
| 5,316,244 | * 5/1994 | Zetena | 174/95 |
| 5,844,763 | * 12/1998 | Grace et al. | 361/111 |
| 5,971,508 | * 10/1999 | Deimen et al. | 312/223.6 |
| 5,980,279 | * 11/1999 | Muller | 439/142 |

\* cited by examiner

Primary Examiner—Dean A. Reichard
Assistant Examiner—Adolfo Nino
(74) Attorney, Agent, or Firm—Douglas E. White

(57) ABSTRACT

A hollow-spine ladder-type cable tray with cable arms has a hollow channel within one of the two body spines which is adapted for running and holding electrical wiring. This is achieved by enlarging at least one of the spines, and thus its hollow channel, and by molding one side face of the spine so as to open outwardly except when covered by one or more snap-on cover plates. The cover plates may include mounts suitable for holding standard 110 or 220 volt electrical outlets, modular telephone jacks, or the like. Preferably, however, separate outlet plates bearing or adapted to bear the outlets are configured to snap on over the open face of at least one spine between adjacent cover plates.

18 Claims, 6 Drawing Sheets

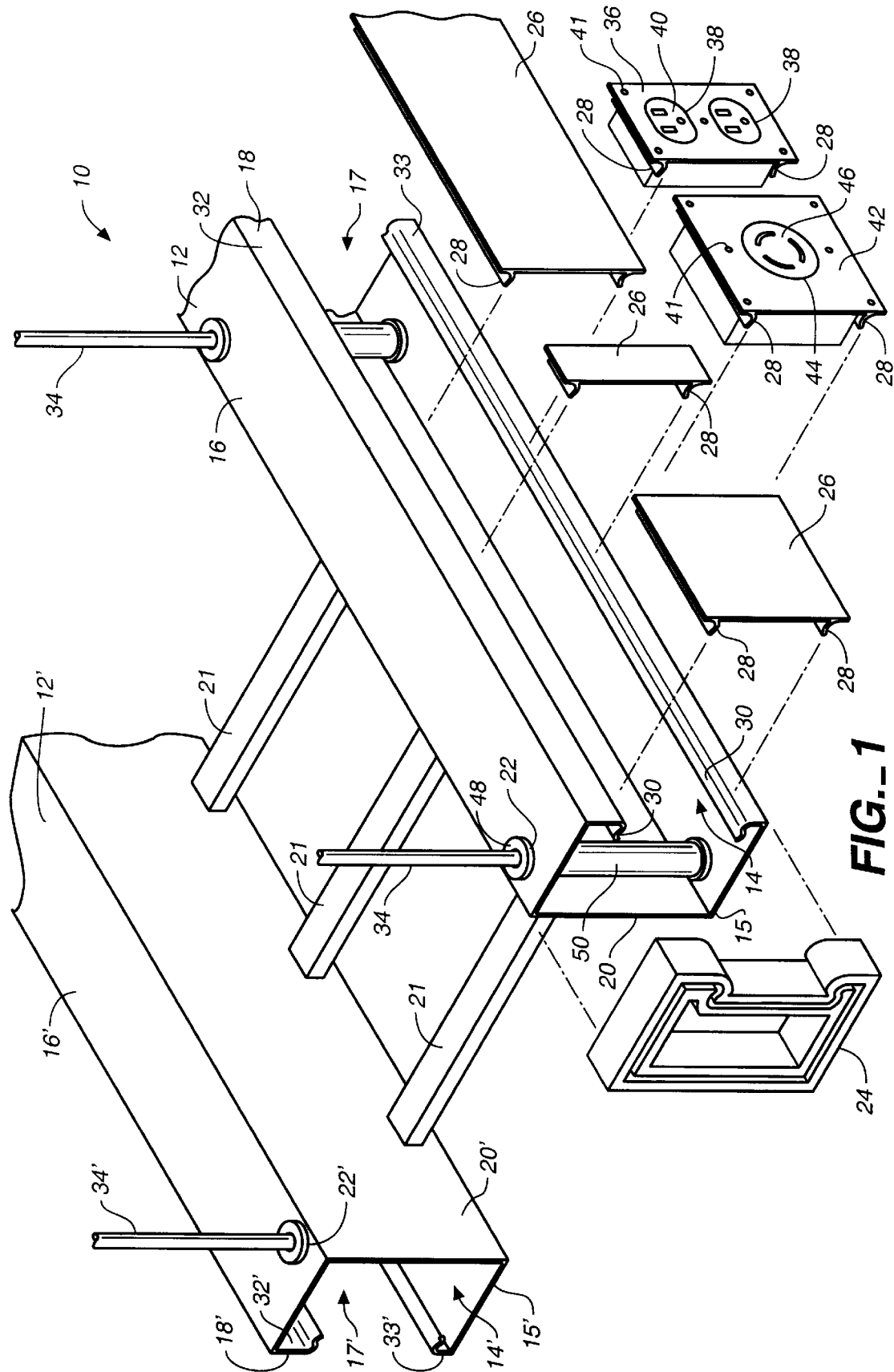
FIG._1

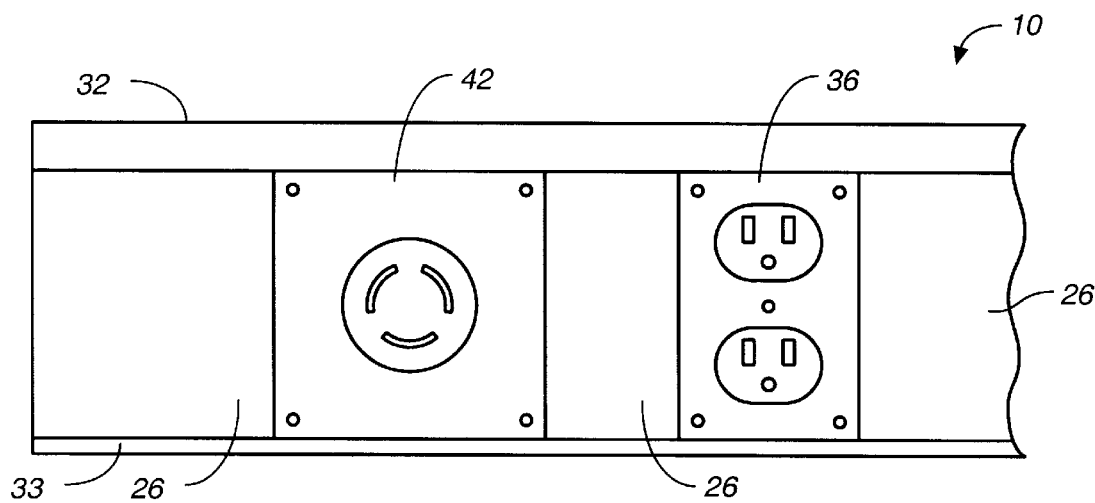
FIG._2
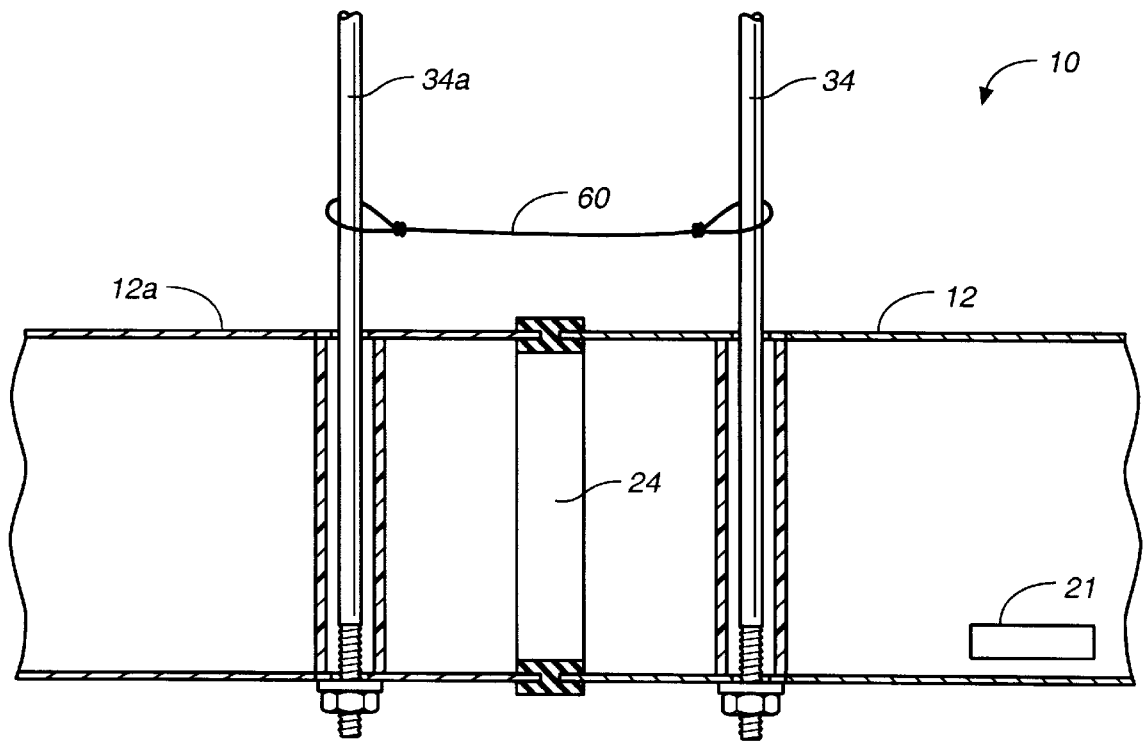
FIG._6

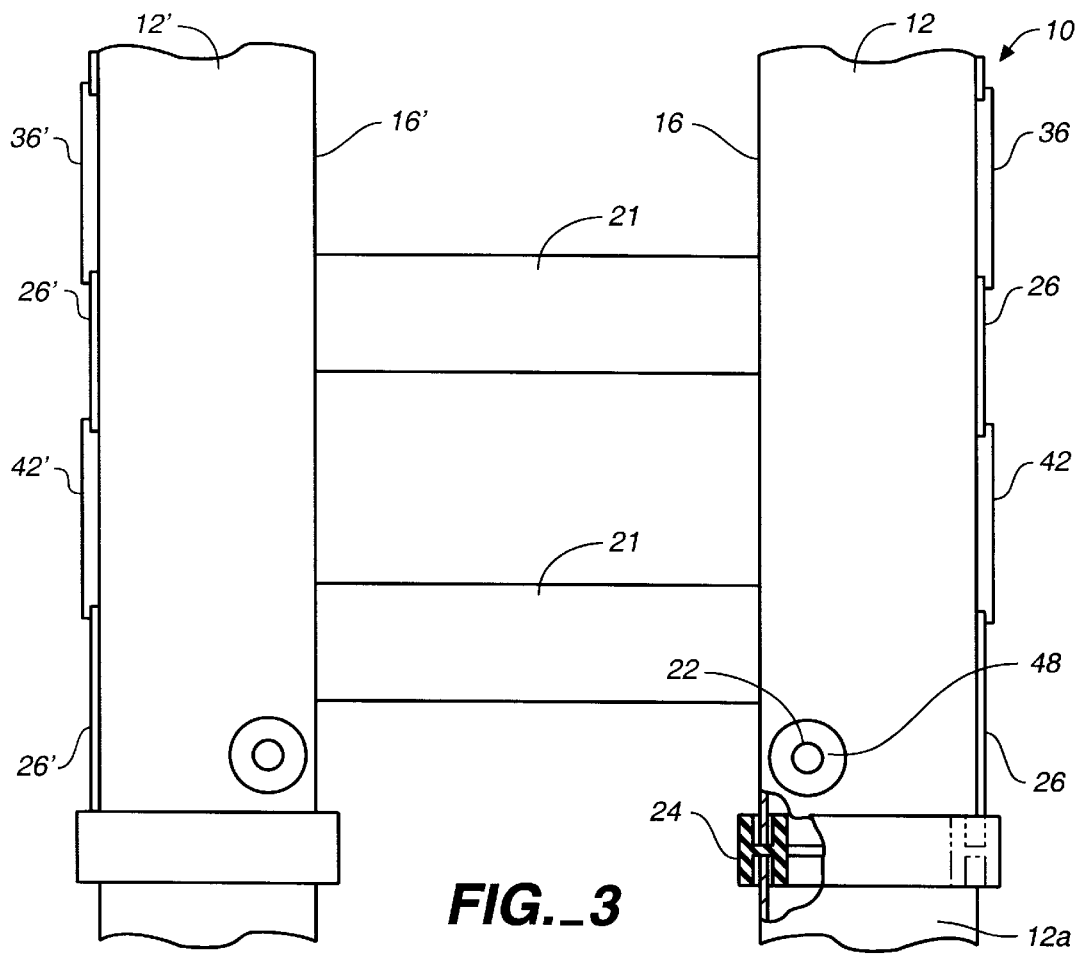
FIG._3
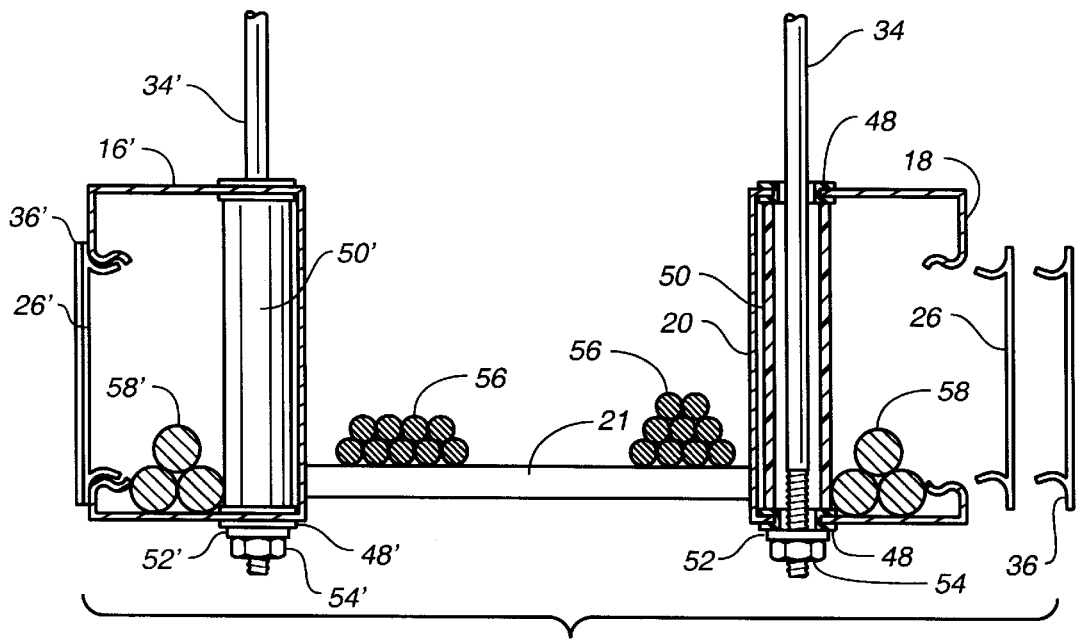
FIG._4

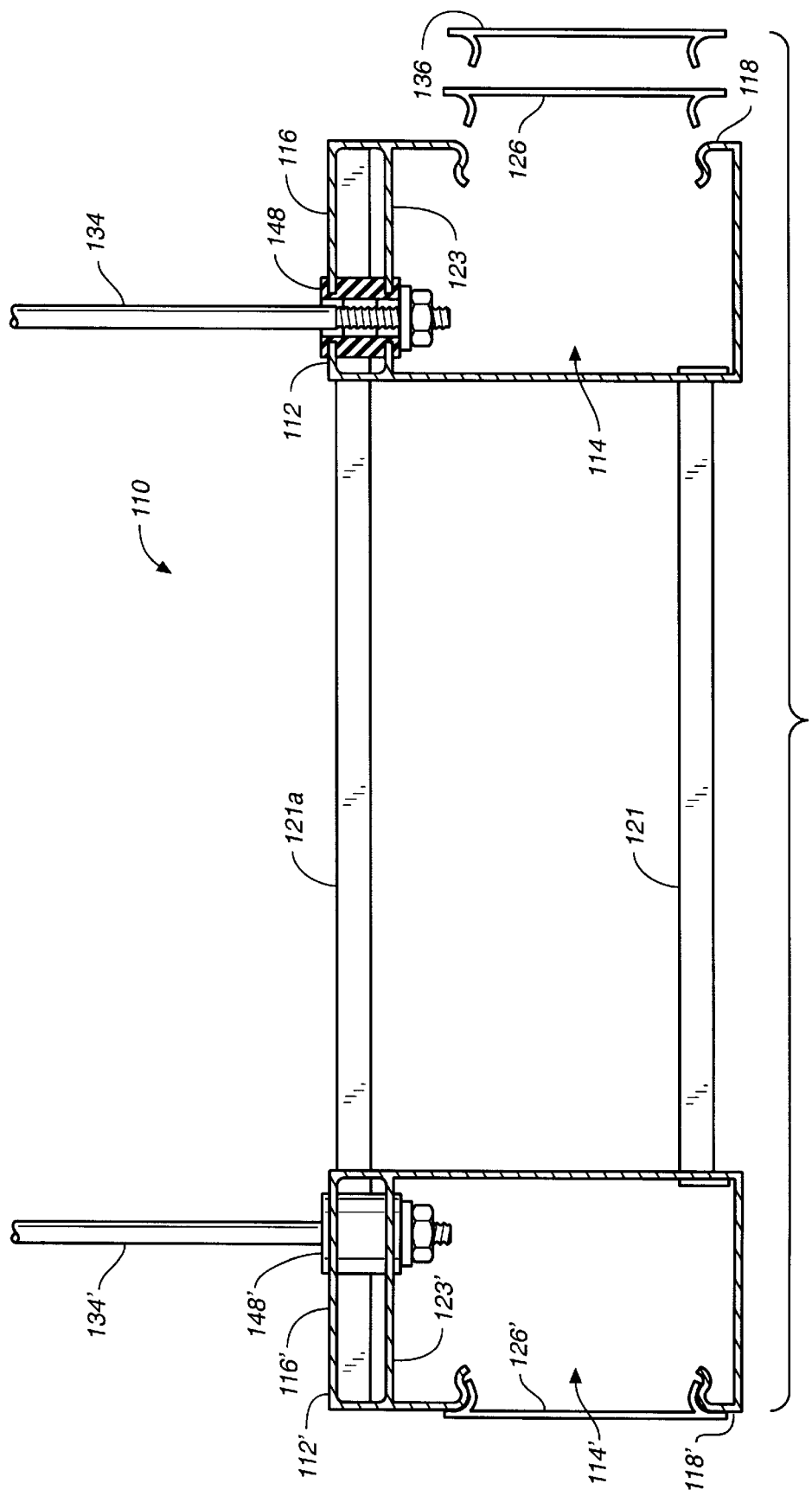
FIG._5

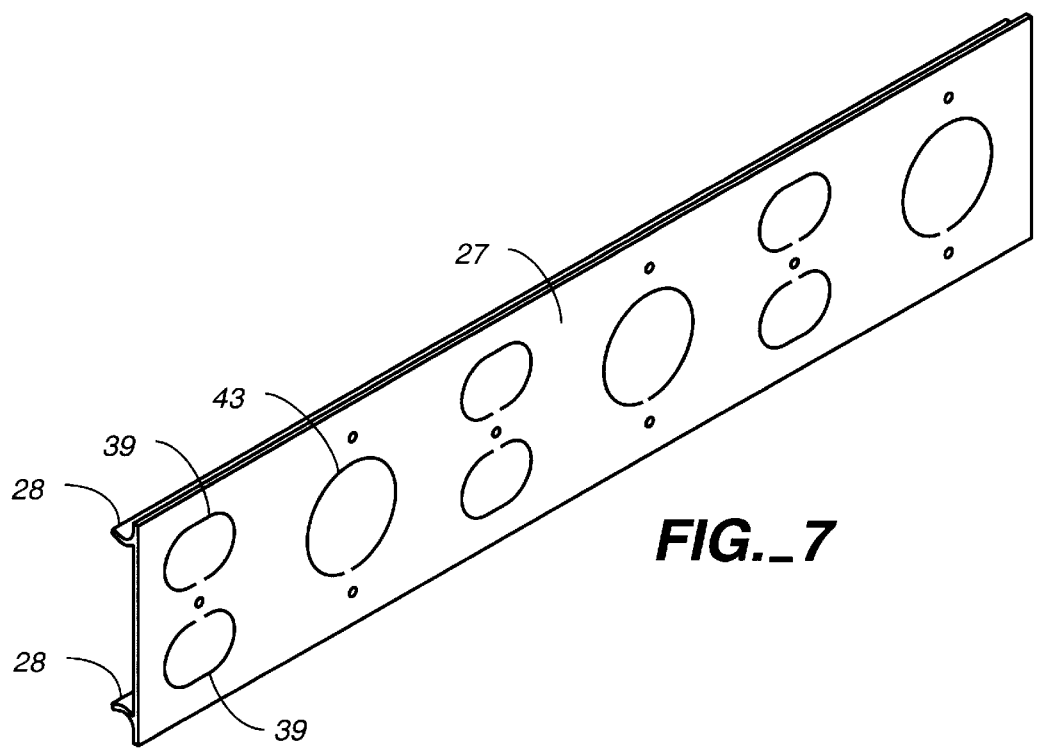
FIG._7
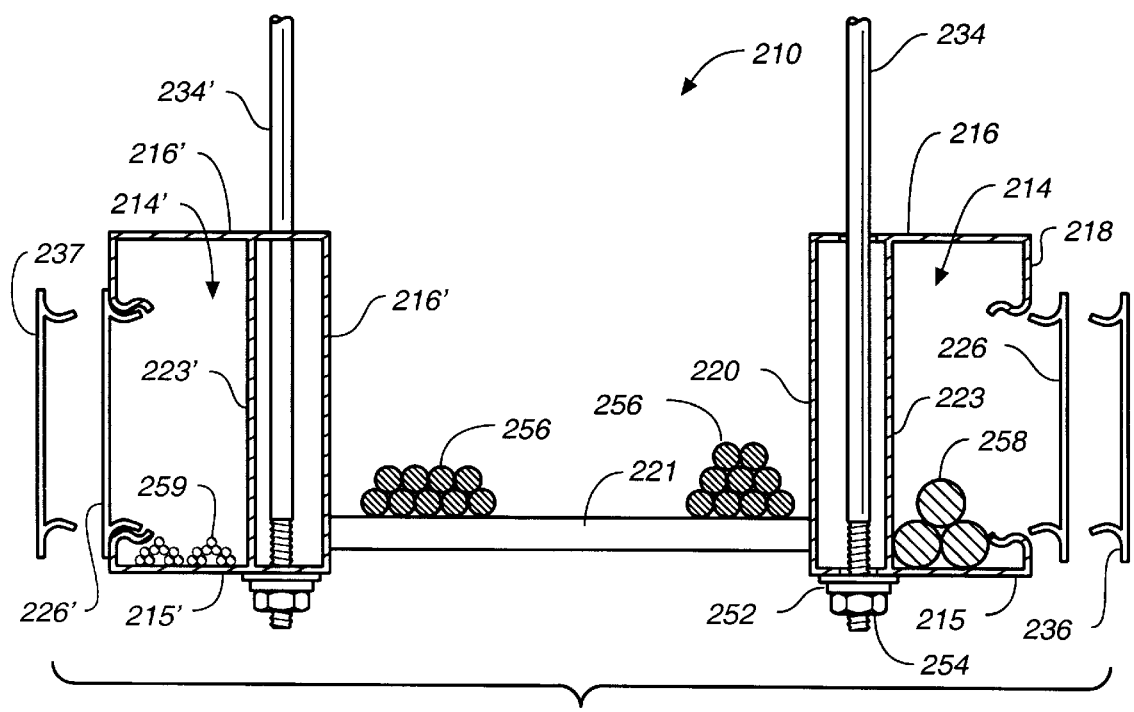
FIG._8

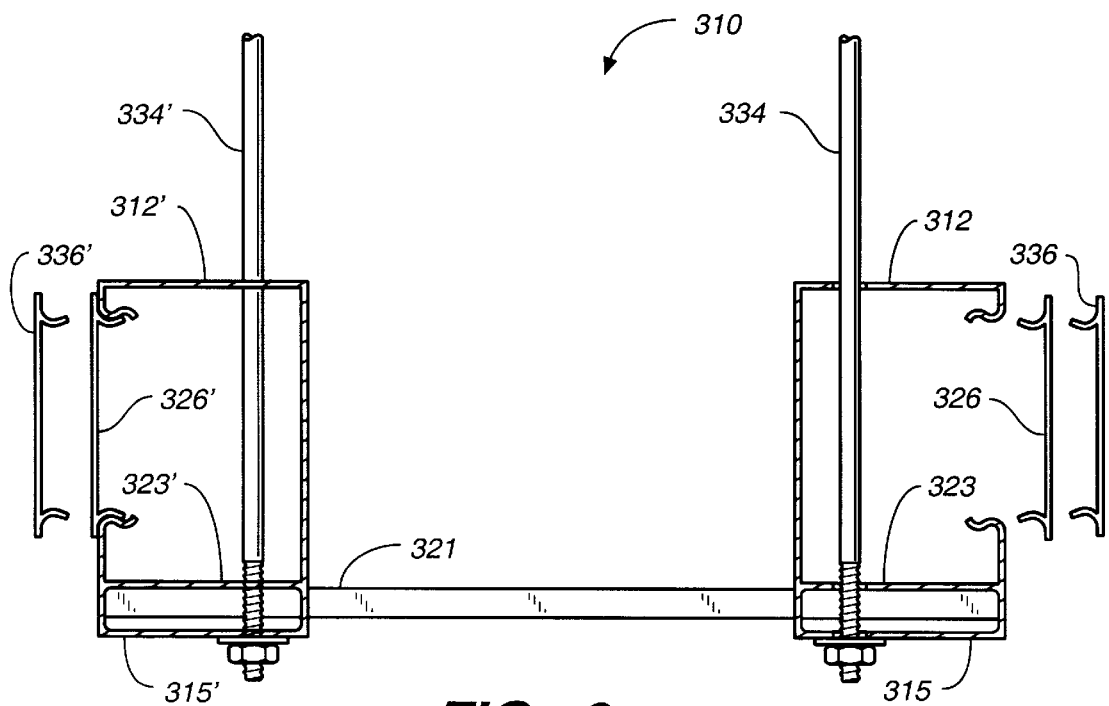
FIG._9
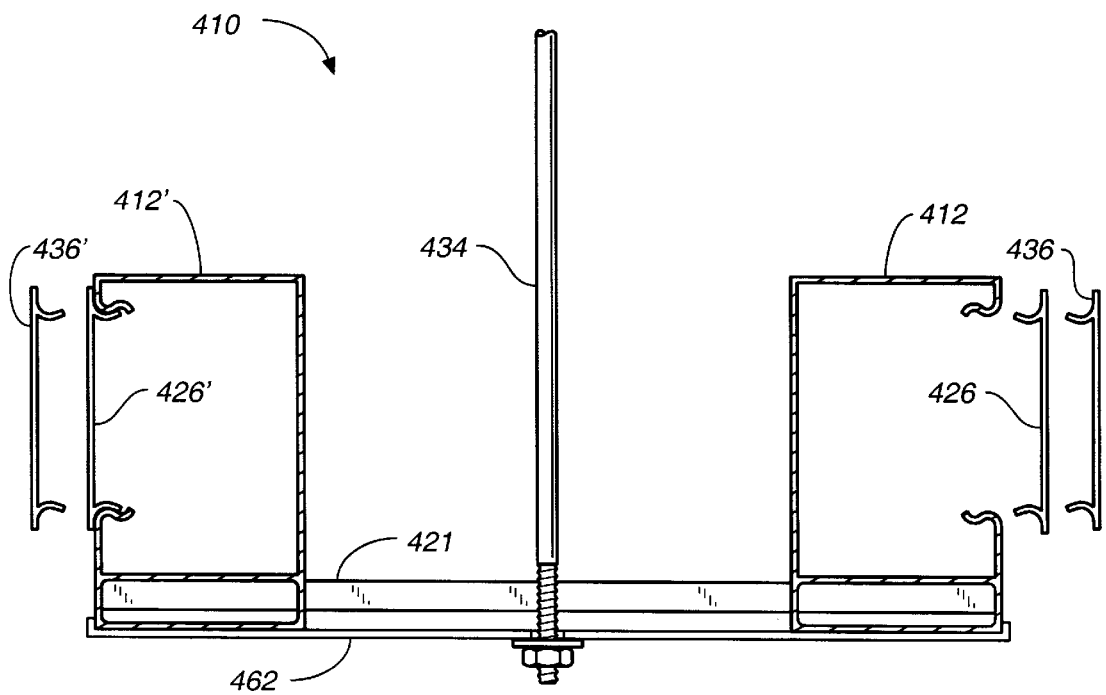
FIG._10

LADDER-TYPE CABLE TRAY WITH POWER CHANNEL

CROSS REFERENCE TO RELATED APPLICATIONS

This application is a continuation in part of U.S. application Ser. No. 09/246,683, filed Feb. 8, 1999.

FEDERALLY SPONSORED RESEARCH OR DEVELOPMENT

Not applicable.

FIELD OF THE INVENTION

This invention relates to cable trays—more particularly, to a ladder-type cable tray having a pair of parallel spines with at least one open side face on at least one of the spines, through which open face may be passed electrical wiring, or data networking or telephone cabling, for ducting through the hollow interior of the open-faced spine.

BACKGROUND OF THE INVENTION

Ladder-type cable trays comprise pairs of beamed or spined members having regularly spaced transverse arms between said spines for cradling cables, wiring, tubes and the like, such as for computer networks, telecommunications and the like. Ladder-type cable trays normally are suspended from ceilings on rods. In computer network installations, ladder-type cable trays are used for routing network cables along the ceiling of a dedicated room to upright components known as racks. Occasionally, the ladder-type cable trays might be laid out on top of the racks. Ladder-type cable trays are often found in large installations where they may travel great distances, both indoors and outdoors, such as at petroleum refineries and the like.

It is also necessary, however, to run electrical power into and around the area to the racks and to other related equipment served by the cable trays. For purposes of isolating the electrical power wiring from interference with communication signals in the network cables, and for reasons of safety, electrical power wiring typically is carried within the hollows of separately mounted ducts called raceways. Prior art ladder-type cable trays, which are limited to carrying externally exposed cabling, therefore are not suitable for electrical wiring. To run electrical wiring along the cable arms thereof would not be in compliance with building code requirements. In order to meet building code requirements and the IEEE specifications, a metallic barrier must separate electrical wiring and low voltage cabling.

Prior developments in this field may be generally illustrated by reference to the following information disclosure statement:

| U.S. Patent Documents | | |
|---|---|---|
| U.S. Pat. No. | Patentee | Issue Date |
| 5,629,496 | J. Navazo | May 13, 1997 |
| 5,659,151 | J. Dale | Aug. 19, 1997 |
| 5.123,618 | D. Geterman et al. | Jun. 23, 1992 |
| 5,323,988 | I. Handler | Jun. 28, 1994 |
| 5,131,860 | S. Bogiel | Jul. 21, 1992 |
| 4,166,195 | A. Schwab | Aug. 28, 1979 |
| 4,017,137 | W. Parks | Apr. 12, 1977 |
| 5,614,695 | J. Benito Navazo | Mar. 25, 1997 |

U.S. Pat. Nos. 5,123,618 and 5,323,988 teach typical cable trays having arms that are designed to hold multiple strands of cable in a distribution system.

U.S. Pat. Nos. 5,131,860, 4,166,195, 4,017,137 and 5,614,695 teach electrical wiring raceways comprising hollow ducts with snap-on covers. Some of these covers feature knockout or punch-out tabs for accepting electrical outlets.

U.S. Pat. Nos. 5,629,496 and 5,659,151 teach other box-like hollow mechanisms having provisions for electrical outlets and wiring.

It is possible to find ladder-type cable trays and electrical raceways mounted side-by-side in a single installation, resulting in a great deal of duplication of effort, materials and the like—not to mention the amount of space wasted in rooms, corridors, and the like—which often are no larger than closets. There has been no suggestion in the art that such unnecessary duplication could be eliminated were a single device to be designed to perform both functions safely.

Accordingly, there continues to be a need for a new and improved ladder-type cable tray which addresses the problems of construction, effectiveness and ease of use that are attendant in the prior art. In this respect, the present invention substantially fulfills this need.

SUMMARY OF THE INVENTION

In view of the disadvantages inherent in the known art, the general purpose of the present invention, which will be described subsequently in greater detail, is to teach a new and improved ladder-type cable tray with power channel which has all of the important advantages of the prior art and few, if any, of the disadvantages.

The present invention is a dual-hollow-spine ladder-type cable tray having cable arms wherein the hollow channel of at least one body spine (presently unused in the art) is adapted for running and holding electrical wiring. This is achieved by enlarging at least one spine, and thus its hollow channel, and by molding one side face of said spine (or both spines) so as to open outwardly except when covered by one or more snap-on cover plates.

The cover plates may include mounts suitable for holding standard 110 volt, 220 volt or NEMA outlets. Preferably, however, separate fixtures (herein "outlet plates") bearing or adapted to bear the outlets are configured to snap on over the open face of one or both spines between adjacent cover plates.

FEATURES AND ADVANTAGES

It is therefore an object of the present invention to provide a new and improved ladder-type cable tray with power channel which has all, or nearly all, of the advantages of the prior art, while simultaneously overcoming most of the disadvantages normally associated therewith.

It is another object of the present invention to provide a new and improved ladder-type cable tray with power channel which may be easily and efficiently manufactured and marketed.

A further object or feature of the present invention is a new and improved ladder-type cable tray with power channel which is of a durable and reliable construction.

An even further object of the present invention is to provide a novel ladder-type cable tray with power channel which is susceptible of a low cost of manufacture with regard to both materials and labor, and which accordingly is then susceptible of low prices of sale to the public, thereby making the ladder-type cable tray with power channel economically available to the trade.

Still another object of the present invention is to provide a novel ladder-type cable tray with power channel wherein an increased ease of assembly is permitted relative to the art.

Another object or feature is a new and improved ladder-type cable tray with power channel that is easy to use, tidy in function and appearance, and suitable for mass production.

Accordingly, a feature of this invention is a ladder-type cable tray including: first and second parallel hollow spines elongated along first and second longitudinal axes; a first top wall of said first spine; a first bottom wall of said first spine; at least one first open side face of said first spine between said first top and first bottom walls, said first open side face forming an elongated first opening parallel to said first longitudinal axis; a plurality of cable arms mounted through said first and second spines perpendicular thereto and perpendicular to said longitudinal axes; and means for mounting at least one type of electrical outlet, said mounting means releasably engaged with said first opening.

A further feature is such an apparatus wherein said cable arms are straight beams, and further including at least one snap-on cover plate releasably engaged with at least said first opening.

Still another feature is disclosed wherein said at least one snap-on cover plate includes said mounting means.

Another feature is wherein said mounting means is a plurality of opposed pairs of knockout tabs adapted to form apertures within which to engage said at least one type of electrical outlet.

In one preferred embodiment, said at least one type of electrical outlet is 110 volt.

A further feature is wherein said mounting means is at least one aperture within which to engage said at least one type of electrical outlet.

As a preferred feature, there are at least two snap-on outlet plates, namely, at least one 110 volt outlet plate having a pair of said at least one apertures within which to engage a first said type of electrical outlet, namely, a 110 volt electrical outlet, and at least one 220 volt (or, alternatively, a NEMA) outlet plate having one of said at least one apertures within which to engage a second said type of electrical outlet, namely, a 220 volt electrical outlet.

Another featured apparatus is one further including a second open side face of said second spine between said second top and second bottom walls, said first and second open faces mounted parallel to each other along opposite longitudinal edges of said first and second spines; and said second open face forming an elongated second opening parallel to said second longitudinal axis, onto which second opening at least said snap-on cover plates may be snapped.

Yet another apparatus features at least one snap-on outlet plate, which said at least one outlet plate includes said mounting means, and features first and second interior reinforcement walls running parallel to said longitudinal axes inside said first and second spines.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWING

The invention will be better understood and objects other than those set forth above will become apparent when consideration is given to the following detailed description thereof. Such description makes reference to the annexed drawing wherein:

FIG. 1 is a broken exploded perspective view of a first preferred ladder-type cable tray with power channel of this invention;

FIG. 2 is a broken right side elevation of the device of FIG. 1;

FIG. 3 is a broken plan view of the device of FIG. 1;

FIG. 4 is an exploded cross sectional frontal elevation of the device of FIG. 1;

FIG. 5 is an exploded cross sectional frontal elevation of a second preferred ladder-type cable tray with power channel of this invention;

FIG. 6 is a broken cross sectional right side elevation showing the interconnection of a pair of the devices of FIG. 1;

FIG. 7 is a perspective view of an alternate embodiment of the cover plate of the device of FIG. 1; and FIG. 8 is an exploded cross sectional frontal elevation of a third preferred ladder-type cable tray with power channel of this invention;

FIG. 9 is an exploded cross sectional frontal elevation of a fourth preferred ladder-type cable tray with power channel of this invention; and FIG. 10 is an exploded cross sectional frontal elevation of a fifth preferred ladder-type cable tray with power channel of this invention.

DRAWING REFERENCE NUMERALS 10 ladder-type cable tray with power channel
12 first spine
12' second spine
14 first power channel
14' second power channel
15 first bottom
15' second bottom
16 first top
16' second top
17 first opening
17' second opening
18 first open face
18' second open face
20 first closed face
20' second closed face
21 cable arm
22 first rod aperture
22' second rod aperture
24 connector
26 first cover plate
26' second cover plate
27 cover plate
28 male flange
30 female flange
32 first upper stub wall
32' second upper stub wall
33 first lower stub wall
33' second lower stub wall
34 first ceiling rod
34' second ceiling rod
36 first 110 V outlet plate
36' second 110 V outlet plate
38 aperture
39 knockout tab
40 110 V outlet
41 screw hole
42 first 220 V outlet plate
42' second 220 V outlet plate
43 knockout tab
44 aperture
46 220 V outlet
48 first ring
48' second ring
50 first spacer
50' second spacer
52 first washer
52' second washer
54 first nut
54' second nut
56 cables
58 electrical wiring
58' electrical wiring
60 tie
110 ladder-type cable tray with power channel
112 first spine
112' second spine
114 first power channel
114' second power channel
116 first top
116' second top
118 first open face
118' second open face
121 cable arm
123 first reinforcement wall
123' second reinforcement wall
126 first cover plate
126' second cover plate
134 first ceiling rod
134' second ceiling rod
136 outlet plate
148 first insulator
148' second insulator
210 ladder-type cable tray with power channel
212 first spine
212' second spine
214 power channel
214' telephone channel
215 first bottom
215' second bottom
216 first top
216' second top
218 first open face
218' second open face
221 cable arm
223 first reinforcement wall
223' second reinforcement wall
226 first cover plate
226' second cover plate
234 first ceiling rod
234' second ceiling rod
236 power outlet plate
237 telephone outlet plate
256 cables
258 electrical wiring
259 telephone cabling
310 ladder-type cable tray with power channel
312 first spine
312' second spine
315 first bottom
315' second bottom
321 cable arm
323 first reinforcement wall
323' second reinforcement wall
326 first cover plate
326' second cover plate
334 first ceiling rod
334' second ceiling rod
336 outlet plate
336' outlet plate
410 ladder-type cable tray with power channel
412 first spine
412' second spine
421 cable arm
426 first cover plate
426' second cover plate
434 ceiling rod 436 outlet plate
436' outlet plate
462 center hung support bracket It is to be noted that, for convenience, the last two positions of the reference numerals of alternative embodiments of the invention duplicate those of the numerals of the embodiment of FIG. 1, where reference is made to similar or corresponding parts. However, it should not be concluded merely from this numbering convention that similarly numbered parts are equivalents.

DETAILED DESCRIPTION OF THE INVENTION

Referring to FIG. 1, there is illustrated therein a first preferred ladder-type cable tray with power channel 10 of this invention. Ladder-type cable tray 10 principally comprises first and second hollow, longitudinally-extended, beam-like spines 12, 12' which spines are pierced by a regularly spaced plurality of straight beam cable arms 21 arranged transversely with respect to the spines 12, 12' (perpendicular to their longitudinal axes). Preferably, the spines are extruded aluminum, but they can be fabricated by standard means from plastic or any of a number of equivalent materials. Preferably, the cable arms 21 also are aluminum. The ladder-type cable tray 10 preferably is suspended from the ceiling of a room from a series of first and second ceiling rods 34, 34', it may be laid on top of equipment or other horizontal surfaces, or it may be suspended from a single line of centrally located ceiling rods in the manner of the embodiment of FIG. 10. The parallel rows of first and second ceiling rods 34, 34' travel though rod apertures 22 22' in both the first and second bottoms 15 15' and the first and second tops 16, 16' of the spines 12, 12', respectively. Except for the apertures 22, 22', the top and bottom walls of both spines are generally closed. Turning briefly to FIG. 4, it can be seen that bundles of cables 56 may be laid loosely along the tops of both sides of the cable arms 21 so as to run parallel to the longitudinal axes of the spines 12, 12'. This much is standard in the art.

Novel to this invention is at least one open face, either first open face 18 or second open face 18' (two such open faces being illustrated in the embodiment of FIGS. 1–4) on one side of at least one of the spines 12, 12'. Preferably, the opposite side of each spine will have a closed face 20, 20'. The tops 16, 16' and bottoms 15, 15' also are continuous panels, giving the spines 12, 12' overall "C" shapes. Each open face 18, 18' has an opening 17, 17' formed between an upper stub wall 32, 32' and a lower stub wall 33, 33', which openings extend along the entire length of the spines 12, 12', respectively.

At least one, and preferably a mixed plurality, of cover plates 26, 26', 110 V outlet plates 36, 36', and 220 V outlet plates 42, 42' are configured to cover the first and second openings 17, 17', respectively. These plates are identical and interchangeable whether used on the first spine 12 or the second spine 12'. Accordingly, they will be described in detail as follows only with respect to those affixed to the first spine 12.

Cover plates 26 snap onto the stub walls by means of opposed pairs of male flanges 28 on the backs of the cover plates 26, which male flanges 28 compress and mate with opposed pairs of female flanges 30 (or simple edges) found on the bottom of the upper stub wall 32 and the top of the lower stub wall 33, respectively. Preferably, such snap-on cover plates are "closed," i.e., they are continuous (without apertures) so as to be able to fully cover whatever portion of the opening 17 onto which they are snapped.

Additionally, electrical outlets are provided, or at least means for mounting at least one electrical outlet (preferably a variety of types of such outlets), such as apertures formed in outlet mounting plates therefor. A 110 V outlet plate 36 forms a pair of apertures 38 adapted to mount and hold a standard 110 V outlet 40 (schematically illustrated in FIG. 1). Apertures 38 comprise one form of means for mounting at least one type of electrical outlet to the apparatus. Because said apertures are formed on a releasable outlet plate 36, the electrical outlet mounting means (i.e, the apertures) are releasably engaged, via the outlet plate 36, with the opening 17. Plate 36 has an opposed pair of male flanges 28 for snapping the 110 V outlet plate 36 onto the female flanges or edges of the upper stub wall 32 and lower stub wall 33. The male flanges 28 may be said to comprise "plate mounting means" to distinguish them from the aforesaid outlet mounting means, namely, apertures in snap-on plates (or tabs for forming such apertures, as discussed below with reference to FIG. 7).

A 220 V outlet plate 42 forms an aperture 44 adapted to hold a standard 220 V outlet 46 (schematically illustrated in FIG. 1) and has an opposed pair of male flanges 28 for snapping the 220 V outlet plate 42 onto the female flanges 30 of the stub walls. Other types of outlet plates can be provided for standard outlets, such as the NEMA type (not illustrated).

As seen in FIG. 2, a suitable assortment of cover plates 26, 110 V outlet plates 36, and 220 V outlet plates 42 may be assembled together to allow the entire opening 17 of the open face 18 to be closed. Furthermore, individual cover plates 26 may be cut to size where necessary, so as to allow particular outlet plates 36, 42 to be precisely positioned wherever desired along any length of spine.

Screw holes 41 are positioned in the outlet plates as required to hold in the outlets 40, 46. Holes may be provided, if desired, for screwing the outlet plates onto the stub walls, for added security.

Again, the construction, function and positioning of the second series of plates 26', 36', and 42' are identical with respect to covering the second opening 17' of the second spine 12', as noted above. Indeed, the same plates may be used interchangeably for either opening 17, 17'.

The novel provision of the open faces 18, 18' allows the hollow interior channels of the spines 12, 12' to be used as power channels 14, 14', i.e., suitable bundles of electrical wiring 58, 58' may be stuffed through the openings 17, 17' into the power channels 14, 14', where they may run unimpeded throughout the longitudinal extent of the ladder-type cable tray with power channel 10 (FIG. 4). Therein, the electrical wiring 58, 58' is sufficiently isolated as to prevent interference with the telecommunication cables 56 carried externally on the cable arms 21. Furthermore, once the first and second openings 17, 17' are fully closed by full lengths of cover plates 26, 26', 110 V outlet plates 36, 36', and 220 V outlet plates 42, 42', the electrical wiring 58, 58' is covered from view and touch. Provided proper insulation and grounding is provided to the spines 12, 12' when required, storage of electrical wiring 58, 58' in the power channels 14, 14' should meet all applicable code requirements.

While a pair of power channels, namely first and second power channels 14, 14', are illustrated in FIGS. 1–4, only one need be provided for most applications wherein only electrical wiring 58, 58' needs to be isolated. The other spine may have all its faces or walls permanently closed (not illustrated). However, a ladder-type cable tray with power channel 10 having two power channels, as illustrated, can allow for two discrete sets of electrical wiring 58, 58' to be segregated from each other, as well as from the cables 56. Furthermore, one power channel can be used to carry electrical wiring 58 and the other used to transport phone cabling (i.e., used as a "telephone channel") in the manner of the embodiment of FIG. 8, essentially without modification. Different types of connector plates supporting telephone connections need only be provided, as in FIG. 8.

FIG. 4 illustrates one means for electrically insulating the spines 12, 12' of a ladder-type cable tray with power channel 10 from the ceiling rods 34, 34', which rods connect the device 10 to the external environment. As noted above, each ceiling rod 34, 34' passes through rod apertures 22, 22' in the tops 16, 16' and the bottoms 15, 15' of the spines 12, 12', respectively. Nuts 54, 54' threaded on the end of each ceiling rod 34, 34' bear the weight of the apparatus 10, perhaps aided by washers 52, 52' or the like. Where electrical insulation between the spines 12, 12' and the ceiling rods 34, 34' is desired, rubber or similar insulating rings 48, 48' in the rod apertures 22, 22' shield each ceiling rod 34, 34' from electrical contact with its respective spine 12, 12'. Tubular insulating spacers 50, 50' may be provided between the tops and bottoms of the spines. Spacers 50, 50' could perform the dual function of insulating the ceiling rods 34, 34' from electrical contact with the electrical wiring 58, 58' while providing structural support between the tops 16, 16' and the bottom 15, 15' walls of the spines.

FIGS. 3 and 6 illustrate the manner in which abutting adjacent lengths of first spine 12 and first spine 12a may be interconnected by means of a C-shaped connector 24 to form a unitary ladder-type cable tray with power channel 10 of any desired length (adjacent lengths of second spines being interconnected in exactly the same manner). If desired, the two first ceiling rods 34 and 34a nearest the interconnected ends of first spine lengths may be tied together by a simple tie 60 (FIG. 6) or similar means, where desired to prevent longitudinal movement during earthquake, storm or the like. FIG. 6 also illustrates the fact that the insulating rings 48, 48' of FIG. 4 possibly may be eliminated—for example, for use of the device 10 in applications wherein electrical insulation is not needed. For example, the channel 14 might be used to carry telephone cables rather than power wires.

FIG. 7 illustrates an alternate form of cover plate 27 for use on the device 10 of FIG. 1, namely, one which is designed to be used without separate outlet plates (such as outlet plates 36, 36' and 42, 42'). In cover plate 27 a regularly spaced plurality of means for mounting at least one type of electrical outlet (preferably a variety thereof), is provided, namely, a large plurality of opposed pairs of knockout (punch-out) tabs 39 adapted to form apertures within which to engage 110 V outlets 40 and a large number of knockout tabs 43 adapted to form apertures within which to engage 220 V outlets 46. As before, the back side of the cover plate 27 contains opposed pairs of male flanges 28 for snapping the cover plate 27 onto the open face 18 of a ladder-type cable tray with power channel 10. A single cover plate 27 of standard length (matching the length of a standard spine 12, 12') can be used to cover an open face 18, 18'. Alternatively, the cover plates 27 and spines 12, 12' can be cut to length at the job site.

Referring to FIG. 5, there is illustrated therein a second preferred ladder-type cable tray with power channel 110 of this invention. Ladder-type cable tray 110 principally comprises a pair of parallel spines, namely, hollow, longitudinally-extended, beam-like first and second spines 112, 112', which spines are pierced by a regularly spaced plurality of straight beam cable arms 121. Preferably, the ladder-type cable tray is extruded aluminum, but it can be fabricated by standard means from plastic or any of an number of equivalent materials. The ladder-type cable tray 110 preferably is suspended from the ceiling of a room from a series of ceiling rods 134, 134' arranged in two parallel rows. In this embodiment, first and second horizontal interior reinforcement walls 123, 123' have been added just below, and parallel to, the top walls 116, 116' within the C-shaped spines 112, 112'. The ceiling rods 134, 134' travel though rod apertures in both the tops 116, 116' and the reinforcement 123, 123' walls. This feature creates larger power (or telephone, etc.) channels 114, 114' than the previous embodiment, but requires more material to construct.

At least one, and preferably a plurality, of cover plates 126, 126' snap onto the open faces 118, 118'. A variety of electrical outlets, or at least mounting plates therefor, are provided for covering either open face—for example, outlet plate 136.

FIG. 5 illustrates a second means for electrically insulating the spines 112, 112' of a ladder-type cable tray with power channel 110 from the ceiling rods 134, 134', which rods connect the device 110 to the external environment. Where electrical insulation between the spines 112, 112' and the ceiling rods 134, 134' is desired, one-piece insulating rings 148, 148' travels from the top walls 116, 116' to the interior walls 123, 123' to shield each ceiling rod 134, 134' from electrical contact with the spines 112, 112'. Essentially, the insulators 148, 148' incorporate the tubular insulating spacer 50 of the previous embodiment shown in FIG. 1.

The embodiment of FIG. 5 otherwise illustrates alternative cable arm heights well known in the art, namely, either placing cable arms low down on the spines near the bottoms thereof, as are cable arms 121, or placing them higher up the spines, near the tops thereof, as are cable arms 121a. Typically, however, one will find only one type of positioning on any one set of cable trays (as in the embodiment shown in FIG. 1). Where solely bottom cable arms are desired, the walls 123, 123' likely would be moved to positions just above cable arms 121, and cable arms 121a would be removed (not illustrated—see, e.g., the embodiments of FIGS. 9 and 10). Where solely top cable arms 121a are desired, the cable arms 121 would be removed.

The variety of cable arms 121, 121a in FIG. 5 illustrate another alternate mode of construction possible with this invention. Note that cable arms 121 travel through only the two innermost facing walls of the spines 112, 112', whereupon they are fastened by crimping, welding, riveting or the like. The longer cable arms 121a, on the other hand, travel through the spines 112, 112' and abut against the two outermost walls (i.e., open faces 118, 118') of the spines. Longer cable arms provide more structural stability; shorter ones provide more room in the power channels and require less material.

Referring to FIG. 8, there is illustrated therein a third preferred ladder-type cable tray with power channel 210 of this invention. Ladder-type cable tray 210 principally comprises hollow, longitudinally-extended, beam-like first and second spines 212, 212', which spines are pierced by a regularly spaced plurality of cable arms 221 arranged transversely with respect to the spines 212, 212' at right angles to their longitudinal axes. Preferable, the spines and cable arms 221 are extruded aluminum. The ladder-type cable tray 210 is suspended from the ceiling of a room from a series of ceiling rods 234, 234', arranged in two parallel rows, or it may be laid on top of equipment or other horizontal surfaces. The ceiling rods 234 travel both the bottoms 215, 215' and the tops 216, 216' of the spines 212, 212'. Bundles of cables 256 may be laid loosely along the tops of either or both sides of the cable arms 221 so as to run parallel to the longitudinal axes of the spines 212, 212'. This much of FIG. 8 is, again, standard in the art.

Novel to this invention is an open face 218 on a first vertical side of the first spine 212 (the right side in FIG. 8). In this embodiment, as, optionally, in the others, the leftmost or second vertical side of the second spine 212' also has a novel open face 218'. Vertical interior reinforcement walls 223, 223' travel within the length of the hollow interiors of the spines 212, 212', providing their two hollow interiors with two channels: on the left or second spine 212' a telephone channel 214', and, on the right or first spine 212 a power channel 214.

As before, the second open face 218' has an opening formed between an opposed pair of stub walls. At least one, and preferably a plurality, of cover plates 226' snap or screw onto the stub walls by means of opposed pairs of male flanges on the backs of the cover plates 226', which male flanges compress and mate with opposed pairs of female flanges found on the stub walls. A variety of telephone outlets or telephone outlet holders, such as outlet plate 237 for a modular phone jack, are provided for snapping or screwing onto the open face 218'.

The first open face 220 has an opening formed between an opposed pair of stub walls. At least one, and preferably a plurality, of cover plates 226 snap onto the stub walls by means of opposed pairs of male flanges on the backs of the cover plates 226. A plurality of means for mounting at least one electrical outlet, preferably a variety thereof, such as outlet plate 236, are provided for snapping onto the open face 220.

The novel provision of the open face 220 allows the hollow interior channel of the first or right spine 212 to be used as a power channel 214, i.e., suitable bundles of electrical wiring 258 may be stuffed therein. On the left or second spine 212', the telephone channel 214' carries separate bundles (or a single cable) of telephone cabling 259.

If insulation and grounding is required by applicable code requirements for storage of electrical wiring 258 in the power channel 214, such may be provided to the spines 212, 212'. In FIG. 8, no special insulation is shown (being the configuration the invention will assume where no insulation is required). However, suitable insulating members, such as ring 48 of the embodiment of FIG. 1 or the insulator 148 of the embodiment of FIG. 5 may be provided. Furthermore, the ceiling rods 234, 234' themselves may be made (or covered) with electrically insulating material.

FIG. 9 is an exploded cross sectional frontal elevation of a fourth preferred ladder-type cable tray with power channel 310 of this invention. The ladder-type cable tray with power channel 310 is similar to the embodiment of FIG. 5, except that the first and second interior reinforcement walls 323, 323' traveling within the spines have been moved to cross the first and second spines 312, 312' near the first and second bottoms 315, 315', respectively. The cable arms 321 are the type which travel through the spines 312, 312' and abut against the two outermost walls thereof. Ceiling rods 334, 334' support the ladder-type cable tray with power channel 310. As before, the open faces of the spines are covered with cover plates 326, 326', and with outlet plates 336, 336' adapted to receive electrical or telephone plugs. While no electrical insulation is shown in FIG. 9 between the spines and the ceiling rods, the types previously discussed can be provided, e.g., the insulators 148 of FIG. 5.

FIG. 10 is an exploded cross sectional frontal elevation of a fifth preferred ladder-type cable tray with power channel 410 of this invention.

The ladder-type cable tray with power channel 410 is similar to the embodiment of FIG. 9, except that a single row of ceiling rods 434 travels down the center of the device, about midway between the first and second spines 412, 412'. Each attaches to a center hung support bracket 462 below the cable arms 421 to support the spines of the ladder-type cable tray with power channel 410. Such center hung support brackets 462 are a standard alternative means of support for ladder-type cable trays in the art and are readily available. As before, the open faces of the spines are covered with cover plates 426, 426', and with outlet plates 436, 436' adapted to receive electrical or telephone plugs.

As to the manner of usage and operation of the instant invention, the same should be apparent from the above disclosure, and accordingly no further discussion relative to the manner of usage and operation of the instant invention need be provided.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

For example, the cover plates and/or outlet plates may be affixed to the open faces by alternate means—the snap-on flanges might be eliminated and replaced by a hinging arrangement or, where a more permanent arrangement is desired, perhaps simply by screws or rivets. The female flanges could be eliminated from the stub walls, whereby the male flanges of the cover plates and outlet plates would simply snap onto the edges of the stub walls. These types of releasable plates are equivalent to the snap-on plates described above.

Therefore, the above description and illustrations should not be construed as limiting the scope of the invention, which is defined by the appended claims.

What is claimed is:

1. A ladder-type cable tray including:
    first and second hollow spines elongated along first and second longitudinal axes, respectively;
    first and second top walls of said first and second hollow spines, respectively;
    first and second bottom walls of said first and second hollow spines, respectively;
    at least one first open side face of said first hollow spine between said first top and first bottom walls, said first open side face forming an elongated first opening parallel to said first longitudinal axis;
    a plurality of cable arms mounted perpendicular to said first and second longitudinal axes, and connecting said first and second hollow spines; and
    means for mounting at least one type of electrical outlet, said outlet mounting means releasably engaged with said first opening.

2. The apparatus of claim 1 wherein:
    said plurality of cable arms are straight beams,
    and further including
        at least one snap-on cover plate releasably engaged with said first opening.

3. The apparatus of claim 2 wherein:
    said at least one snap-on cover plate includes said outlet mounting means.

4. The apparatus of claim 3 wherein:

said outlet mounting means is a plurality of opposed pairs of knockout tabs adapted to form apertures within which to engage said at least one type of electrical outlet.

5. The apparatus of claim 4 wherein:

said at least one type of electrical outlet is 110 V.

6. The apparatus of claim 2 further including:

at least one snap-on electrical outlet plate releasably engaged with said first opening.

7. The apparatus of claim 6 wherein:

said at least one snap-on electrical outlet plate includes said outlet mounting means.

8. The apparatus of claim 7 wherein:

said outlet mounting means is at least one aperture within which to engage said at least one type of electrical outlet.

9. The apparatus of claim 8 wherein:

said at least one snap-on electrical outlet plate is at least two snap-on electrical outlet plates, namely,
- at least one 110 V electrical outlet plate having a pair of said at least one apertures within which to engage a first said type of electrical outlet, namely, a 110 V electrical outlet, and
- at least one 220 V electrical outlet plate having one of said at least one apertures within which to engage a second said type of electrical outlet, namely, a 220 V electrical outlet.

10. The apparatus of claim 2 further including:

a second open side face of said second hollow spine between said second top and second bottom walls;

said first and second open side faces mounted parallel to each other along opposite longitudinal edges of said first and second hollow spines; and said second open side face forming an elongated second opening parallel to said second longitudinal axis, onto which second opening said at least one snap-on cover plate also may be releasably engaged.

11. The apparatus of claim 10 further including:

at least one snap-on electrical outlet plate, which said at least one outlet plate includes said outlet mounting means; and first and second interior walls within said first and second hollow spines running parallel to said first and second longitudinal axes, respectively.

12. A ladder-type cable tray including:

first and second hollow spines elongated along parallel first and second longitudinal axes, respectively;

generally closed first and second top walls of said first and second hollow spine, respectively;

generally closed first and second bottom walls of said first and second hollow spines, respectively;

at least one first open side face of said first hollow spine between said first top and first bottom walls, said first open side face forming an elongated first opening parallel to said first longitudinal axis;

a plurality of straight beam cable arms mounted through said first and second hollow spines perpendicular thereto and perpendicular to said first and second longitudinal axes; at least one cover plate releasably engageable with at least said first opening; and means for mounting at least one type of electrical outlet, said outlet mounting means releasable engageable with at least said first opening.

13. The apparatus of claim 12 further including:

a plurality of ceiling rods supporting said first and second hollow spines.

14. The apparatus of claim 13 further including:

at least one electrical outlet plate releasably engageable with at least said first opening, which said at least one electrical outlet plate includes said outlet mounting means; and means for electrically insulating said hollow spine from said ceiling rods, wherein said ceiling rods pass through at least said first and second top walls.

15. The apparatus of claim 14 wherein:

said outlet mounting means is at least one aperture within which to engage said at least one type of electrical outlet.

16. The apparatus of claim 15 wherein:

there are at least two electrical outlet plates, namely,
- at least one 110 V electrical outlet plate having a pair of said apertures within which to engage a first type of electrical outlet, namely, a 110 V electrical outlet, and
- at least one 220 V electrical outlet plate having one of said apertures within which to engage a second type of electrical outlet, namely, a 220 V electrical outlet.

17. The apparatus of claim 16 further including:

a second open side face of said second hollow spine between said second top and second bottom walls;

said first and second open side faces formed parallel to each other along said first and second hollow spines, respectively; and said second open side face forming a second opening parallel to said second longitudinal axis, onto which second opening said at least one cover plate and said electrical outlet plates also may be releasably engaged.

18. The apparatus of claim 17 further including:

first and second interior walls running parallel to said first and second longitudinal axes within said first and second hollow spines, respectively.

* * * * *